Aug. 25, 1953     A. G. STEINMAYER     2,650,263
BRACKET CONSTRUCTION
Filed June 4, 1948     2 Sheets-Sheet 1
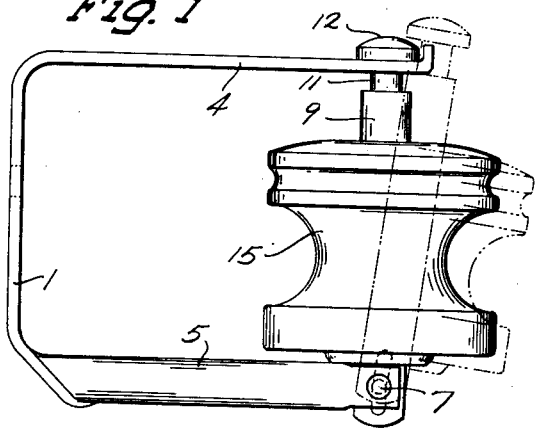
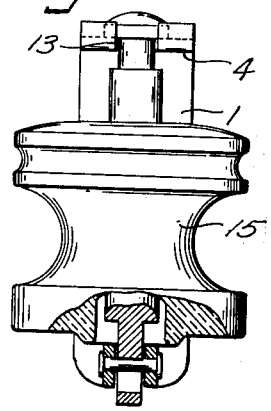
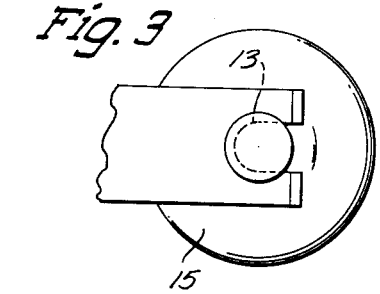
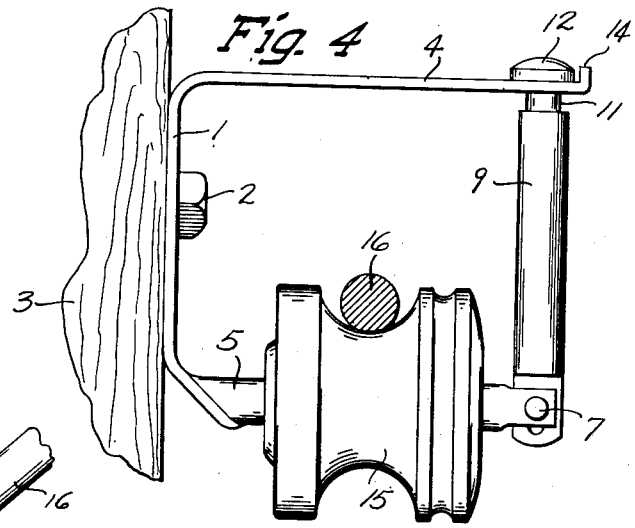
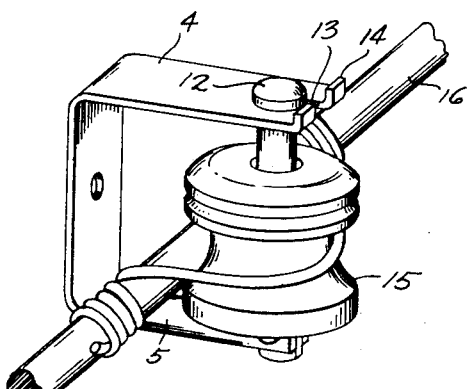
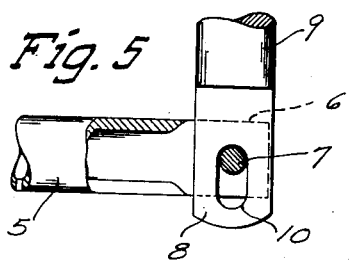
INVENTOR.
Alwin G. Steinmayer
BY
Arthur R. Woolfolk
Attorney Aug. 25, 1953 — A. G. STEINMAYER — 2,650,263
BRACKET CONSTRUCTION
Filed June 4, 1948 — 2 Sheets-Sheet 2

INVENTOR.
Alwin G. Steinmayer
BY
Arthur R. Woolfolk
Attorney

Patented Aug. 25, 1953

2,650,263

UNITED STATES PATENT OFFICE 2,650,263

BRACKET CONSTRUCTION

Alwin G. Steinmayer, Milwaukee, Wis., assignor to McGraw Electric Company, a corporation of Delaware Application June 4, 1948, Serial No. 31,005

3 Claims. (Cl. 174—161)

This invention relates to bracket constructions for line wires.

In stringing line wires, for instance in power distribution systems, it is the usual practice to extend the wire past a number of supporting poles and attach a toggle device to the wire and stretch it and thereafter distribute the sag in the wire between successive poles. Subsequently, the wire is attached to suitable insulators. Various attempts have been made to provide brackets with insulators which act somewhat in the nature of spools or pulleys for temporarily supporting the wire while it is being stretched and while the sag is being distributed between successive poles but these attempts have not proven wholly satisfactory as the constructions were relatively weak and could not stand the strains incident to this type of work without considerable danger of distorting or damaging the bracket constructions and also as the prior constructions were frequently relatively expensive to manufacture and were not, therefore, so freely used.

This invention is designed to overcome the above noted defects and objects of this invention are to provide bracket constructions for line wires which are so made that the porcelain or other insulator is formed in the manner of a spool and initially supports the wire while it is being strung, and allows the distribution of the sag of the wire between successive poles and subsequently acts as the insulator to which the wire or line is permanently attached, the construction providing an unusual amount of strength to resist distortion on the one hand and being of an extremely simple type of construction on the other, so that it may be very cheaply manufactured and may be as freely used as the customary insulators and which is so made that it does not have the disadvantageous features hereinabove enumerated.

Further objects are to provide a construction in which the main body of the bracket is stationary and in which a pin is provided for normally holding a spool-like insulator, and in which the pin is either pivotally or removably carried by the stationary portion of the bracket and is so arranged that the insulator may be slipped over a rounded portion of the stationary part of the bracket and the pin may be replaced in its normal position to retain the insulator in place, the insulator while being supported by the stationary portion of the bracket providing a pulley-like construction and being freely revoluble so that the line wire may be drawn over the insulator with ease and without any danger of damaging such wire, the insulator being thereafter returned to its initial position on the pin and the line wire being permanently tied thereto.

Further objects are to provide bracket constructions for line wires which are relatively simple and cheap and which are easy to install and use.

Embodiments of the invention are shown in the accompanying drawings, in which:

Figure 1 is a side view of one form of the invention showing the normal position of the parts in full lines and showing the position of the parts in dotted lines when the pin is being rocked outwardly as hereinafter described.

Figure 2 is a front view of the structure shown in Figure 1 with parts broken away and in section.

Figure 3 is a fragmentary top plan view of the structure shown in Figure 1.

Figure 4 is a view corresponding to Figure 1 showing the position of the insulator while the line wire is being strung and before it is tied permanently to the insulator.

Figure 5 is a fragmentary detail partly in section of a portion of the bracket structure.

Figure 6 is a view showing the line wire permanently attached to the insulator.

Figure 7:
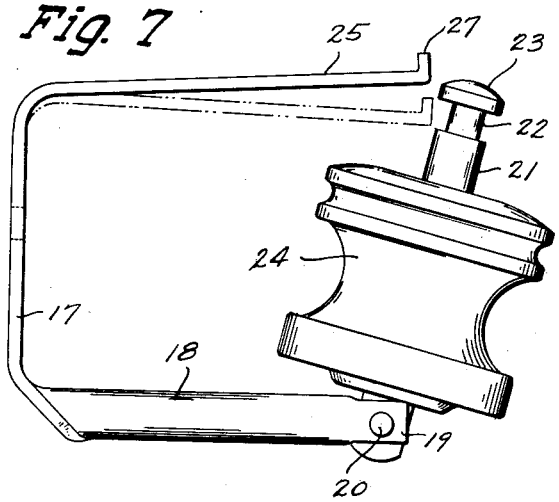
Figure 7 shows a further form of the invention, such view showing the pin as it is being rocked outwardly and showing in dotted lines the normal position of the upper bracket arm when it is held downwardly by means of the pin.

Referring to the drawings, particularly Figures 1 through 6 showing the first form of the invention, it will be seen that the bracket construction comprises a stationary body portion 1 which is adapted to be attached by means of a bolt or lag screw 2 to a pole or other suitable support indicated by the reference character 3 in Figure 4. The body portion 1 of the bracket is formed of relatively heavy strap metal and comprises an upper arm 4 and a lower, rounded arm 5. The lower, rounded arm is formed as shown most clearly in Figure 5 by folding or rounding the side portions of the lower arm 5 into an approximately tubular form with the lower arms in proximity to each other. The outer end of the lower arm 5 terminates in a pair of lips 6 which carry a pivot pin 7 on which the flattened and slotted portion 8 of a round pintle pin or axle-like member 9 is pivoted. In this form of the invention the lower flattened portion 8 of the pin 9 is provided with an elongated slot 10 which receives the pivot pin 7.

The pin 9 is provided with a reduced portion 11 adjacent its upper end and terminates in an upper head 12. The upper arm 4 is slotted or notched as indicated at 13 in Figures 2, 3, and 6, and is adapted to receive the reduced portion 11 of the pin 9. The upper arm 4 is also provided with an up-turned flange or flanges 14 at its extreme outer end that are positioned outside of or beyond the head 12 of the pin 9 when the pin is in normal position.

The pin 9 revolubly supports a spool-like insulator 15 of porcelain or other suitable insulating material, and it is to be noted that the size of the lower, rounded or tubular arm 5 is approximately the same as that of the pin 9, so that the spool-like insulator 15 can be revolubly carried by the rounded arm 5 as shown in Figure 4. In order to get the insulator 15 from the position shown in Figure 1 to that shown in Figure 4, all that is necessary is to raise the pin 9 slightly so that its head 12 clears the outer flange 14 of the upper arm 4 and thereafter rocks the pin downwardly into alignment with the lower arm 5. At this time, the insulator 15 may be slipped from the pin 9 onto the rounded, lower arm 5. Thereafter the pin is rocked back to its initial position and locked behind the flange or flanges 14 as shown in Figure 4. This retains the insulator in position.

During the stringing and stretching of the line wire, such line wire indicated at 16 in Figures 4 and 6 is threaded through the bracket and rests upon the revolubly mounted spool-like insulator 15. After the wire has been strung past a sufficient number of poles, a block and tackle is employed to stretch the wire to its desired tension and the sag between successive poles is adjusted or distributed in the correct or desired manner. Subsequently, the wire is tied to the insulator 15 in any suitable manner, for instance, as shown in Figure 6. It may be tied to the insulator 15 while the insulator is in the position shown in Figure 4 or the insulator may be repositioned on the pin 9 by first rocking the pin down into alignment with the arm 5 and thereafter sliding the insulator onto the pin 9, the wire being subsequently tied to the insulator.

It is obvious that the wire could be positioned either on the inner or outer side of the insulator with respect to the bracket when it is finally tied in place.

Figure 8:
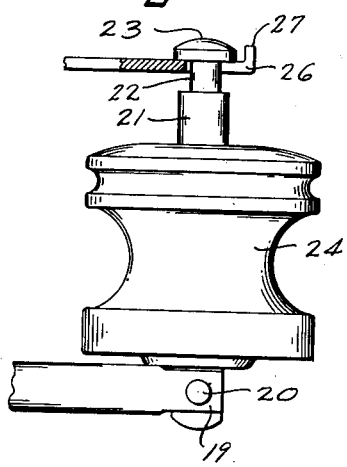
Figure 8 is a fragmentary detail of the structure shown in Figure 7, such view being partly broken away and partly in section.

In the form of the invention shown in Figures 7 and 8 the bracket 17 may be attached to a support as previously described and is provided with a rounded, lower arm 18, similar to the arm 5, which lower arm is provided with lips or tongues 19 at its extreme end. These lips carry a pivot pin 20 which forms a pivot support for the lower end of the pintle pin or shaft 21. The pin 21 has a reduced portion 22 adjacent its upper end and has an upper head 23. It revolubly carries a spool-like insulator 24 and may be rocked down into alignment with the rounded, lower arm 18 so that the insulator 24 may be slipped onto the rounded, lower arm 18 as previously described during the stringing, stretching, and sagging of the line wire. The upper arm 25 is somewhat springy and is slotted or notched as indicated at 26 and provided with an outer flange or flanges 27 which project upwardly.

In using the form of the invention shown in Figures 7 and 8, almost identically the same procedure is followed as that previously described except that when it is desired to detach the pin 21 from the upper arm 25, all that is necessary is to press the arm 25 downwardly to clear the head 23. Thereafter the pin may be rocked outwardly as previously described. It is to be noted that in this form of the invention it is not necessary to slot the lower end of the pin 21.

Figure 9:
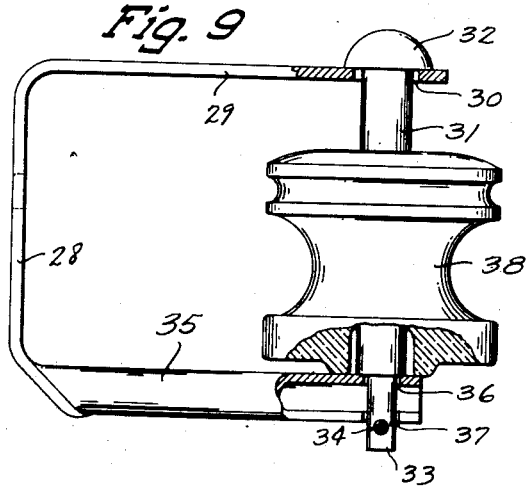
Figure 9 is a view corresponding to Figure 1 showing a further form of the invention, such view being partly broken away and partly in section.
Figure 10:
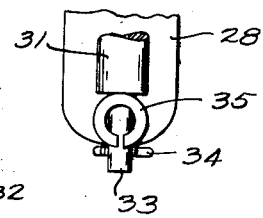
Figure 10 is a fragmentary detail of the structure shown in Figure 9.
Figure 11:
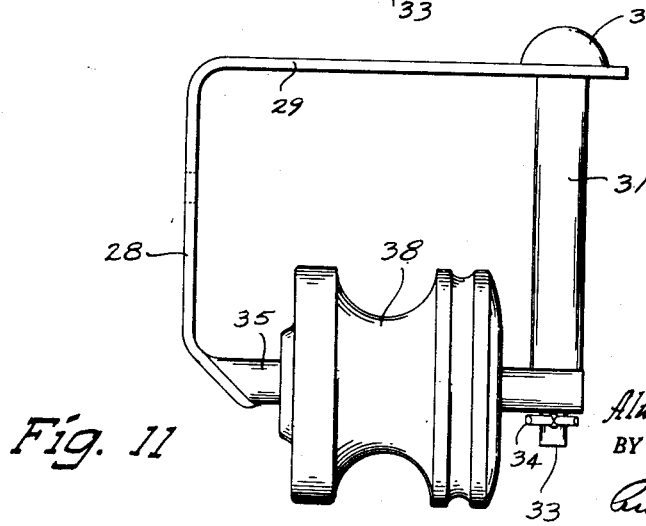
Figure 11 is a view showing the position of the insulator while the line wire is being strung for the form of the invention shown in Figure 9.

In the form of the invention shown in Figures 9, 10, and 11, the bracket 28 is provided with an upper arm 29 provided with an aperture 30 through which the pintle pin 31 normally projects. This pintle pin is provided with an upper head 32 and with a reduced lower portion 33 which is apertured to receive the slit pin 34.

The lower arm 35 is rounded similarly to the arms 5 and 18 as previously described and is provided with an aperture 36 through its upper portion and with apertures or notches 37 through its lower portion, so that the reduced part 33 of the pin may project through the apertures.

The pintle pin 31 revolubly carries a spool-like insulator 38.

In using this last form of the device, when it is desired to string, stretch, or sag the wires, the pin 31 is removed after first removing the split pin 34. Thereafter the insulator is revolubly positioned on the rounded lower arm 35 of the bracket and the wire is threaded through the bracket and rests upon the revolubly supported insulator 38 as previously described and as shown for the first form of the invention in Figure 4. The pin 31 may be repositioned during the stringing of the wire in order to prevent any possible dislodging of the insulator 38. The split pin 34 may be either repositioned or may not be used at this time.

After the line wire has been strung, stretched and properly sagged between successive brackets, it is tied to the insulator and the insulator is positioned on the pin 31. Obviously the wire can be tied to the insulator in any of the several forms of the invention while the insulator has its axis horizontal or while the insulator has its axis vertical depending on which is most convenient to the lineman.

It will be seen that novel forms of bracket structures have been provided which afford a very firm and secure support for revolubly carrying a spool-like insulator during the stringing, stretching, and sagging of the line wires, and in which the effective lever arm of the bracket is relatively short. This construction, therefore, does not allow severe strains to be imposed on the bracket during manipulating of the line wires as described hereinabove. Instead the spool-like insulator is carried by the bracket at a point closely adjacent the support.

It will be seen further that the devices are simple to make and may be cheaply constructed and may be easily used.

Although this invention has been described in considerable detail, it is to be understood that such description is intended as illustrative rather than limiting, as the invention may be variously embodied and is to be interpreted as claimed.

I claim:

1. A bracket construction for line wires comprising a U-shaped supporting member arranged to be attached to a support and having a pair of outwardly projecting arms, a pintle pin pivotally mounted on one of said arms and normally detachably interlocked with the other of said arms, and a spool-like insulator having a bore therethrough and carried by said pin, one of said arms being arranged to revolubly support said insulator and having its largest transverse dimension less than said bore for selectively and revolvably positioning said insulator on said pin or said arm, and said pin being arranged to be rocked into alignment with said last mentioned arm to allow said insulator to be slipped from said arm onto said pin or from said pin onto said arm.

2. A bracket construction for line wires comprising a U-shaped supporting member arranged to be attached to a support and having outwardly projecting upper and lower arms, one of said arms being rounded and the other of said arms being slotted and provided with an upstanding outer flange, the rounded arm having a pair of spaced lips, a pivot pin extending between said lips, a normally vertical pintle pin having an elongated slot through which said pivot pin passes and having its free end arranged to be normally received in the slot of the slotted arm and having a head normally positioned behind the flange of the slotted arm, and a spool-like insulator selectively positioned on said rounded arm or on said pin and having a bore therethrough, said rounded arm and said pintle pin each having a diameter less than said bore, the rounded arm being arranged to revolubly support said insulator while the line wire is being strung and said pin being adapted to be moved axially for detaching the head thereof from said flange and rocked into alignment with the rounded arm, whereby said insulator may be slipped from the rounded arm onto said pin or from said pin onto the rounded arm, said pin during stringing of said line wire being arranged to act as a retainer to prevent dislodgment of said line wire from said bracket.

3. A bracket construction for line wires comprising a U-shaped member having an outwardly projecting rounded arm provided with a pivot pin adjacent its outer end and having an outwardly projecting resilient arm provided with a slot in its outer end having an outer up-turned flange, a pintle pin pivotally mounted on the pivot pin of said rounded arm and having a portion adapted to be received in the slot of said resilient arm and having a head normally positioned behind the flange of said resilient arm, and a spool-like insulator arranged to be selectively revolubly carried by said rounded arm or carried by said pintle pin, said rounded arm and said pintle pin each having a diameter less than said bore, said insulator when carried by said rounded arm being arranged to act as a revoluble support for a line wire while it is being strung and said pin being arranged to be interlocked with said resilient arm to prevent said line wire from becoming dislodged from said bracket during stringing of said line wire.

ALWIN G. STEINMAYER.

References Cited in the file of this patent

UNITED STATES PATENTS

| Number | Name | Date |
| --- | --- | --- |
| 1,802,965 | Brady | Apr. 28, 1931 |
| 2,008,744 | Brady | July 23, 1935 |
| 2,255,530 | Pittman et al. | Sept. 9, 1941 |
| 2,302,883 | Olivier | Nov. 24, 1942 |